United States Patent [19]

Cojan

[11] 4,193,666
[45] Mar. 18, 1980

[54] DISPLAY COLLIMATOR SYSTEM INCLUDING A STANDBY RETICLE ARRANGEMENT

[75] Inventor: Yves Cojan, Paris, France

[73] Assignee: Thomson-CSF, Paris, France

[21] Appl. No.: 905,435

[22] Filed: May 12, 1978

[30] Foreign Application Priority Data

May 17, 1977 [FR] France ................. 77 15050

[51] Int. Cl.² .................................. G02B 27/02
[52] U.S. Cl. .................................. 350/174; 350/114
[58] Field of Search .............. 352/174, 301, 286; 350/302, 298, 174, 10; 358/250; 356/251, 252, 21; 340/25, 27, 162, 105; 353/13

[56] References Cited

U.S. PATENT DOCUMENTS

| | | | |
|---|---|---|---|
| 3,614,314 | 10/1971 | Rossire | 350/174 |
| 3,777,404 | 12/1973 | Oreck | 350/10 |
| 3,782,822 | 1/1974 | Spence | 350/10 |
| 3,848,974 | 11/1974 | Hosking et al. | 350/174 |
| 3,851,304 | 11/1974 | Picardat | 350/174 |
| 3,864,025 | 2/1975 | Picardat | 350/174 |
| 3,945,716 | 3/1976 | Kinder | 350/174 |
| 4,000,419 | 12/1976 | Crost et al. | 350/174 |
| 4,097,155 | 6/1978 | Appert | 350/174 |
| 4,111,527 | 9/1978 | Cojan | 350/174 |

*Primary Examiner*—John K. Corbin
*Assistant Examiner*—B. Wm. de los Reyes
*Attorney, Agent, or Firm*—Cushman, Darby & Cushman

[57] ABSTRACT

A display collimator system comprising a cathode-ray tube for displaying electronically generated data and a standby reticle arrangement to be operated in case of failure of the tube. The standby reticle arrangement comprises at least a movable reticle produced statically by means of a plurality of n elements juxtaposed according the intended direction of shift, each element comprising a light source to represent, when supplied, a one and same common shape, and a supply control circuit having n switching positions to supply the n elements separately.

6 Claims, 8 Drawing Figures

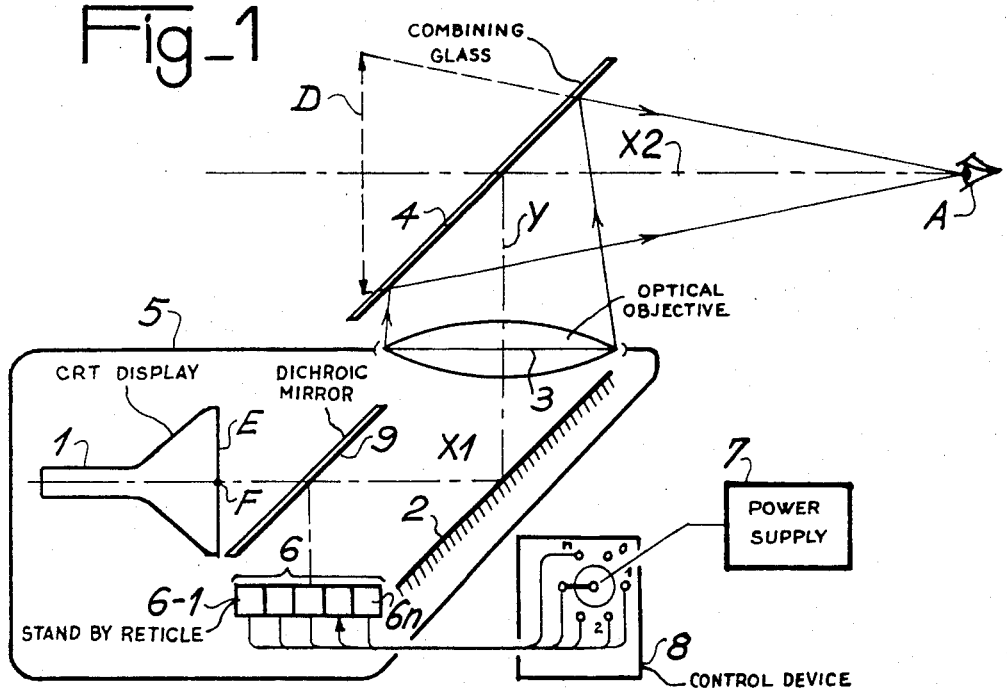
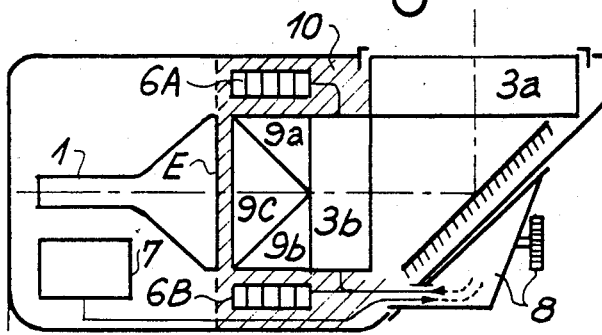
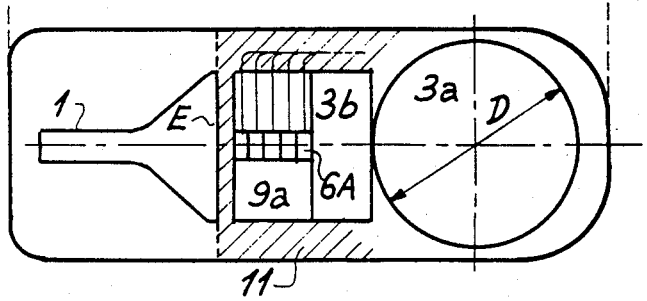

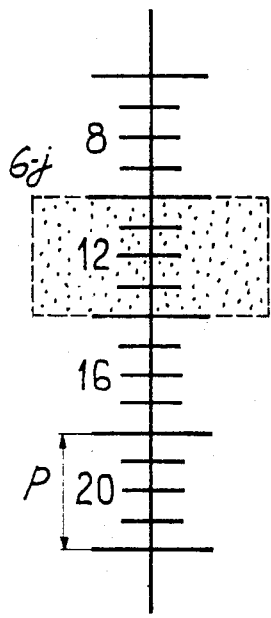
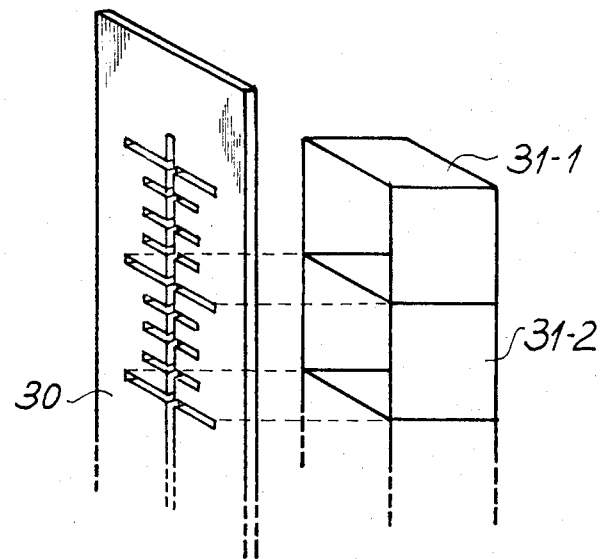
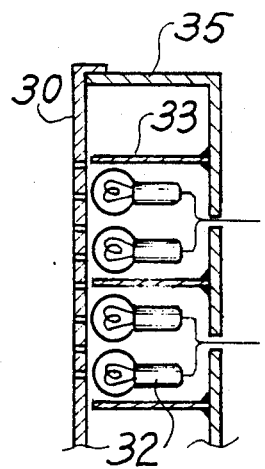
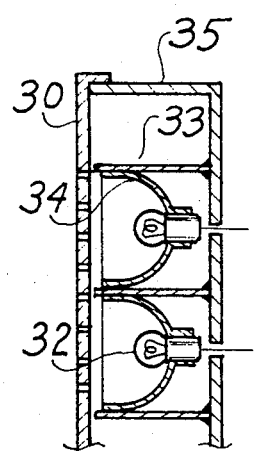
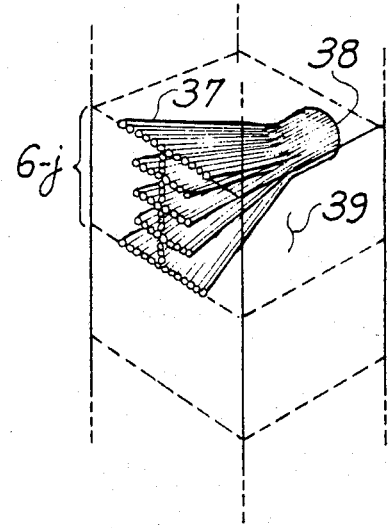

DISPLAY COLLIMATOR SYSTEM INCLUDING A STANDBY RETICLE ARRANGEMENT

BACKGROUND OF THE INVENTION

This invention relates to display collimator systems using a cathode ray tube for displaying electronically generated data and including standby reticle means for operation in the event of an electronic failure.

An optical collimator is intended to project to infinity the images of luminous objects which are arranged, for this purpose, in the focal area of an optical objective. As applied to aerial navigation, the luminous objects represent navigational information or information to assist with landing and are seen by the pilot through a semi-transparent combining glass superimposed on the outside world.

The luminous objects, also called reticles, are generated on the screen of the cathode-ray tube. There are other ways of producing reticles, by means of back-lighted masks or by means of equivalent arrangements such as those employing light-emitting diodes or optical fibres, which involve a large number of parts. In the case envisaged, a serious problem exists if the single display component formed by the cathode ray tube should break down in flight, since the pilot then no longer has any of the projected information available to him.

To deal with such drawbacks, the head-up-display is advantageously fitted with one or more standby reticles which are able to be substituted for the tube in the event of a display breakdown and which enable nevertheless a reduced amount of information useful for navigation purposes to be made available.

From the optical point of view, the standby reticles need to be situated in the focal plane in the same way as the screen of the cathode-ray tube. The collimator generally has a reflecting mirror arranged between the screen of the tube and the exit lens, and in addition the optical system is usually divided into two sets of lenses a first of which is arranged between the screen of the cathode-ray tube and the reflecting mirror and the second of which forms the exit optic. Consequently, there is only a small space between the screen of the tube and the first set of lenses and this makes it difficult to position a retractable standby reticle arrangement in this space. The solution generally adopted is to arrange the standby reticles at the sides in unoccupied spaces off the optical path traversed by the light rays coming from the screen of the cathode-ray tube. To allow operation in both modes, that is normal and standby, a semi-transparent dichroic mirror, or an equivalent optical arrangement based on prisms, is inserted on the optical axis running from the screen so that radiation from the tube will be transmitted with a high coefficient in transmission and that emitted by the standby reticles will be reflected with an equally high coefficient, it being understood that the two types of radiation lie in different spectral bands. The positions of the reticles and the mirror are so calculated that the plane of the reticles corresponds to a focal plane of the optical system. This technique has an advantage which derives from the fact that it does not require any mechanical arrangement for retracting the reticles. However, to render the reticles mobile in a predetermined direction, generally in elevation, it is necessary to have a mechanical arrangement, which is manually operated from the pilot's position, to shift the reticles with a suitable translatory movement or to control their shift. The pilot sets the rise, that is to say the desired value in elevation, manually, and this results in one or more of the standby reticles being shifted in their plane to the appropriate position in elevation.

SUMMARY OF THE INVENTION

One object of the invention is to produce a display collimator system which has an entirely static arrangement of standby reticles which meets the requirement for one or more of the reticle images to be shifted linearly and which overcomes the disadvantages of mechanical contrivances, which derive in particular from the fact of: their complexity, the difficulties which exits in constructing them given the small amount of space available to fit them in, and the effect which this has on the reliability and cost of the equipment.

In accordance with a feature of the present invention, there is provided a display collimator system which comprises: a device for displaying luminous objects on the screen of a cathode-ray tube, an optical collimator assembly to project an image of the said objects to infinity, a semi-transparent combining glass to allow the image to be viewed superimposed on the external surroundings, and a standby reticle arrangement comprising, at least one reticle disposed laterally to the tube, dichroic mirror means for transmitting to the optical assembly radiation coming from the screen of the tube and that coming from the standby reticles, a power supply for supplying the standby reticles, and control means for shifting at least one of the standby reticles to produce a corresponding reticle image which is moveable in a predetermined direction, the said reticle arrangement being entirely static, a moveable reticle comprising at least one plurality n of elements which are juxtaposed in the said direction, the control means comprising a switch device having n positions to supply the said n elements separately, each element being of one and the same common shape which represents a said moveable reticle to be projected, and each position of the switch corresponding to a predetermined position for the image of the said moveable reticle in the shift direction.

BRIEF DESCRIPTION OF THE DRAWINGS

Other features of the invention will be more apparent to those skilled in the art upon a consideration of the following description and accompanying drawings, which show:

FIG. 1, a simplified diagram of a display collimator system according to the invention;

FIGS. 2a and 2b, diagrammatic views in elevation and plan respectively of a collimator of conventional design, to show in particular the lateral siting of the standby reticle arrangement;

FIG. 3, an example of a standby reticle to be produced and;

FIG. 4 to 7, detail diagrams relating to various embodiments of a moveable standby reticle as shown in FIG. 3.

DESCRIPTION OF THE PREFERRED EMBODIMENT

The display collimator system which is shown in the diagram of FIG. 1 includes a device for generating luminous objects, or reticles, on the screen of a cathode-ray tube 1. The screen E is positioned in the focal plane of the optical collimating system and is centred on the corresponding focus F, the axis of the cathode-ray tube and the optical axis X1 being substantially coincident. The optical system is represented by an exit lens 3. The optical path is deflected by a reflecting mirror 2 to allow the collimator apparatus to be of compact design and easier to install. The structure 1 to 3 is supplemented by a combining glass 4. The luminous objects, which are generated by a predetermined scan by the electron beam, are projected to infinity by the collimator and the viewer such as the pilot, in the case of aircraft display, looking through the glass 4 and the windscreen (not shown) of the cockpit, sees the external surroundings and the projected image of the luminous reticles superimposed.

The display system also includes an arrangement for generating standby reticles. This arrangement comprises at least one luminous reticle 6 which is laterally disposed off the optical path for light rays which leads from the screen E to the optical system 2, 3, 4, a power supply 7 for the standby reticle or reticles 6, a control device 8 to bring the standby reticle facility into action and to control the shift of the moveable reticles, and a plane dichroic mirror 9 which is inserted between the screen E and the mirror 2. To save space, the mirror 9 is preferably in two or more parts, as also are the reticles 6. Such an arrangement in shown in FIGS. 2a and 2b, where the mirror 9 is formed by an arrangement of three prisms 9a, 9b, 9c and the reticles by two elements 6A and 6B.

FIGS. 2a and 2b, which are elevation and plan views respectively, give a better idea of the lateral spaces which are available to accommodate the standby reticles and the associated connections. These spaces 10 and 11 are those indicated by hatching. These views also show the system of refractors divided into two sets 3a and 3b. The diameter D of the exit lens forms a limit for the size of the optical pupil (FIG. 1) of the apparatus, the pupil being defined by the outline of the image of the exit lens through the glass 4. Each of the sets 3a and 3b may contain a plurality of lenses, three to five for example. The set 3b is intended in particular to produce a field correction. The planes in which the standby reticles 6A and 6B are respectively situated correspond to focal planes of the optical system 3b, 3a, as also does the plane of the screen E.

For reasons of simplicity, the following description and the accompanying figures relate to a standby reticle which is oriented in the elevation direction and which is rendered moveable in this direction, it being understood that the standby reticle arrangement may include other fixed or moveable reticles which are not necessarily oriented in the elevation direction.

In accordance with the invention, the standby reticle 6 is formed by a plurality n of elements 6-1 to 6-n which are juxtaposed in the intended direction of shift and which are supplied with power separately through the control device 8. A single shape to be projected forms the moveable reticle concerned and each of the elements 6-j is of this shape; the mobility of the reticle results from switching the power supply selectively, only one element being supplied at a time. In this way the standby reticle arrangememt may be designed to be entirely static while including both fixed and movable reticles.

Understanding of the invention will be assisted by reference to FIGS. 3 to 7, which relate to embodiments of a moveable reticle. FIG. 3 shows the overall pattern to be projected which is formed, for example, by a scale which is uniformly graduated at a constant pitch P. The scale is formed by a vertical bar and carries horizontal graduations. The pitch P may for example be 40 mrd. At any given time in the standby operating mode only part of this overall pattern is luminous or illuminated, this part corresponding to one element 6-j, which represents a vertical expanse equal to the pitch P. The graduations 8, 12, 16, 20 etc. form reticles which are fixed in the sense that they are an integral part of the corresponding element.

The reticle may consist of a mask having transparent areas which reproduce the overall pattern, as shown at 30 in FIG. 4. Member 30 may be produced by photographic means on a negative film or mechanically in the form of a cut-out sheet. At the rear of the elements 6-1 to 6-n, the lighting is partitioned off into separate spaces 31-1, 31-2, . . . 31-n. The mask 30 maybe back-lighted by means of miniature bulbs 32 which are divided among spaces 31-1 to n formed in a partitioned mechanical support. Each space may comprise a plurality of bulbs (FIG. 5) or only on (FIG. 6), in conjunction with dividing partitions 33 and reflectors 34 to define the area 6-j of the mask, or the reticle element, to be illuminated. The assembly is held in position in a housing 35. Other methods, employing light-emitting diodes or optical fibres for example, may be envisaged to produce the reticle of FIG. 3. FIG. 7 shows an example of this. Optical fibres 37 form the shape of the reticle at one end and at the other end they are grouped together at 38, in the case of each element 6-j, to form a cylindrical bundle which may easily be uniformly illuminated by a source of the miniature bulb kind which is not shown. The fibres are encapsulated in a plastics material 39 to hold them in position. For reasons of simplicity, the fibres of only a single block forming an element 6-j have been shown.

The pilot sees a projected reticle which comprises the amount of rise selected (for example 120 mrd in FIG. 3), a vertical line, and a series of five horizontal lines spaced apart from one another at 10 mrd. The pilot then estimates the actual rise which interests him as compared with the projected information as a whole.

The rise zone is preselected by operating the switch 8, which has n working positions to produce the n different positions of the movable reticle. The switch 8 is at the disposal of the pilot and is situated at the control position or at the front of the collimator housing (FIG. 2a). It may have a neutral position corresponding to normal operation with the cathode-ray tube. The power supply 7 may come from circuits associated with the cathode-ray tube, as shown in FIG. 2a where the switch unit 8 is fitted to the front of the collimator, or to the instrument panel, to allow easy checking or repair in case of need.

To allow the mirror 9 to function with high coefficients of transmission and reflection of the order of 85% the light sources are selected to radiate in a spectral band different from that of the tube. If for example the tube emits in the green band of the visible spectrum around 0.52 μm, miniature bulbs having tungsten filaments may be used to emit in the red band of the visible spectrum round 0.65 μm.

The standby reticle arrangement according to the invention is characterised by the absence of moving mechanical parts, the shift control being entirely electrical. It becomes a rigid entity which is fixed in relation to the rest of the collimator and particularly the optical system and it can easily be fitted laterally in the small spaces 10 and 11 available (FIG. 2), thus being capable of production in a very compact form.

What is claimed is:

1. A collimator system for a head-up display comprising: a device for displaying luminous objects on the screen of a cathode-ray tube;
   an optical collimator assembly to project an image of said objects to infinity;
   a semi-transparent combining glass to allow the image to be viewed superimposed on the external surroundings; and
   a standby reticle arrangement comprising:
   at least one reticle disposed laterally to the tube;
   dichroic mirror means for transmitting to the optical assembly radiation coming from said screen of said tube and that coming from said standby reticle arrangement;
   a power supply for supplying said standby reticle arrangement; and
   control means for selectively powering portions of said reticle arrangement to produce a corresponding reticle image which is moveable in a predetermined direction, said reticle arrangement being entirely static, and including a plurality of n elements which are juxaposed corresponding to said direction, said control means comprising a switch device having n positions coupling said supply to said n elements separately, each such element being of one and the same common shape representing a portion of said reticle to be projected, and each position of said switch corresponding to a predetermined position for said moveable image of said reticle in said shift direction.

2. A display system according to claim 1, wherein the said movable reticle is formed by means of a plane opaque support having transparent areas which represent the common shape to be projected repeated n times, and by means of at least n light sources which are associated with respective ones of the said transparent areas.

3. A display system according to claim 1, wherein the said movable reticle is formed by means of n groups of light sources, the sources being arranged in the same way in each group to produce the said common shape.

4. A display system collimator according to claim 3, wherein the light sources in each group are formed by means of an optical fiber bundle lighted at one end by a light source and whose optical fibers are arranged at the other end to produce the reticle pattern to display.

5. A display system according to claim 3, wherein the light sources are provided by electroluminescent diodes.

6. An aircraft display system according to claim 1 in which the diochroic splitter is formed by a groupe of three prisms having faces treated, the said movable standby reticle is distributed laterally in two planes symmetrical about the axis of the tube and represents a graduated vertical scale carrying marked values for elevation in relation to a reference formed by the longitudinal axis of the aircraft.

* * * * *